US006793566B2

(12) United States Patent
Owen

(10) Patent No.: US 6,793,566 B2
(45) Date of Patent: Sep. 21, 2004

(54) TOOL GUIDE

(76) Inventor: Leslie John Owen, 30 Bennett Road, Thurgoona, New South Wales 2640 (AU)

( * ) Notice: Subject to any disclaimer, the term of this patent is extended or adjusted under 35 U.S.C. 154(b) by 0 days.

(21) Appl. No.: 10/347,483

(22) Filed: Jan. 21, 2003

(65) Prior Publication Data

US 2003/0139121 A1 Jul. 24, 2003

Related U.S. Application Data

(60) Provisional application No. 60/386,437, filed on Jun. 7, 2002.

(30) Foreign Application Priority Data

Jan. 24, 2002 (AU) .............................................. PS0142

(51) Int. Cl.$^7$ .............................................. B24B 41/00
(52) U.S. Cl. ...................................... 451/342; 451/139
(58) Field of Search ................................ 451/340, 341, 451/342, 14, 20, 344, 370, 378, 386, 391; 409/235; 144/135.4, 135.3, 135.2, 136.1

(56) References Cited

U.S. PATENT DOCUMENTS 3,450,176 A * 6/1969 Pollak ........................ 83/486.1
4,947,910 A * 8/1990 Reneau ........................ 144/371
6,592,308 B1 * 7/2003 Owen ......................... 409/235

* cited by examiner

Primary Examiner—Dung Van Nguyen
(74) Attorney, Agent, or Firm—Dennison, Schultz, Dougherty & MacDonald

(57) ABSTRACT

A guide for a machine tool including a housing adapted for mounting onto and traversal along an elongate track, the housing including a carriage for mounting a guide arm for controlled movement relative to the track. The guide arm has a mount for fitting said machine tool and said housing has at least one top track wheel, at least one side track wheel and at least one oblique track wheel adapted for rolling along the top, side and edge of the elongate track, respectively.

14 Claims, 4 Drawing Sheets

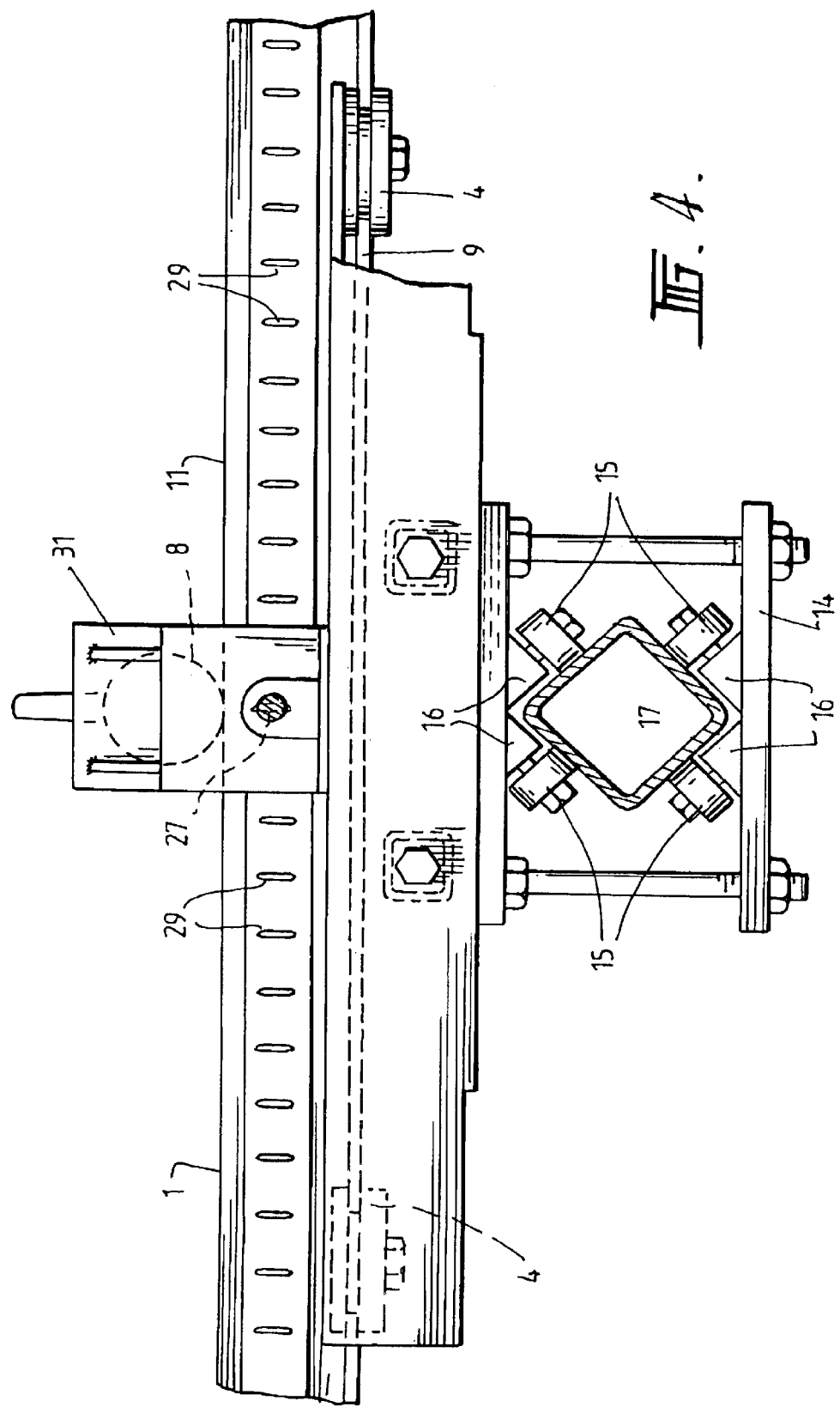

TOOL GUIDE

This application claims the benefit of provisional application 60/386,437 filed on Jun. 7, 2002.

FIELD OF THE INVENTION

This invention relates to machine tool guides and in particular to a guide for an electric router or sander which is adapted to cooperate with a portable wood milling machine.

BACKGROUND OF THE INVENTION

Portable wood mills are compact wood sawing machines adapted for longitudinally slicing tree logs into planks. Such mills generally comprise a track system for guiding a large bandsaw or chainsaw along the length of a log. The portable and lightweight construction of such mills allows timber to be harvested on site and cut into manageable planks for transport and further machining.

Such portable mills are not generally regarded or used as "finishing" tools and produce rough sawn timber for further handling.

Whilst portable mills are not currently used for refined or finishing machining the guiding Systems and wood handling facilities available with portable mills would not exclude such machining if suitable guides were available for use with finishing machine tools like the electric router and sander.

SUMMARY OF THE INVENTION

In one aspect the invention provides a guide for a machine tool comprising a housing adapted for mounting onto and traversal along an elongate track, said housing including a carriage means for mounting a guide arm for controlled movement relative to said track, said guide arm having a mount for fitting said machine tool wherein said housing has at least one top track wheel, at least one side track wheel and at least one oblique track wheel adapted for rolling along the top, side and edge of said elongate track respectively.

The top, side and oblique track wheels are preferably adapted for rolling along opposing surfaces of said track so as to provide snug engagement of the housing to the track.

The oblique track wheel preferably simultaneously opposes both top and side track wheels.

The track may include a lower channel section and a raised side portion.

The top and oblique track wheels may include "V" groove treads with the top tread adapted to straddle said raised side portion of the elongate track and the oblique track wheel straddling a lower edge of the elongate track The bottom track wheel may include either a "V" or flat tread.

The housing most preferably unfolds to facilitate installation onto said track at any point along the length of said track.

The guide arm may be of square channel section mounted diagonally within said carriage to prevent radial co-axial movement but allow linear co-axial movement within said carriage. The linear movement of the guide arm may be controlled by a threaded screw.

BRIEF DESCRIPTION OF THE DRAWINGS

The invention will now be described with references to the following figures.

FIG. 4 shows a top view of the guide fitted to a section of track.

DETAILED DESCRIPTION OF THE INVENTION

Figure 1:
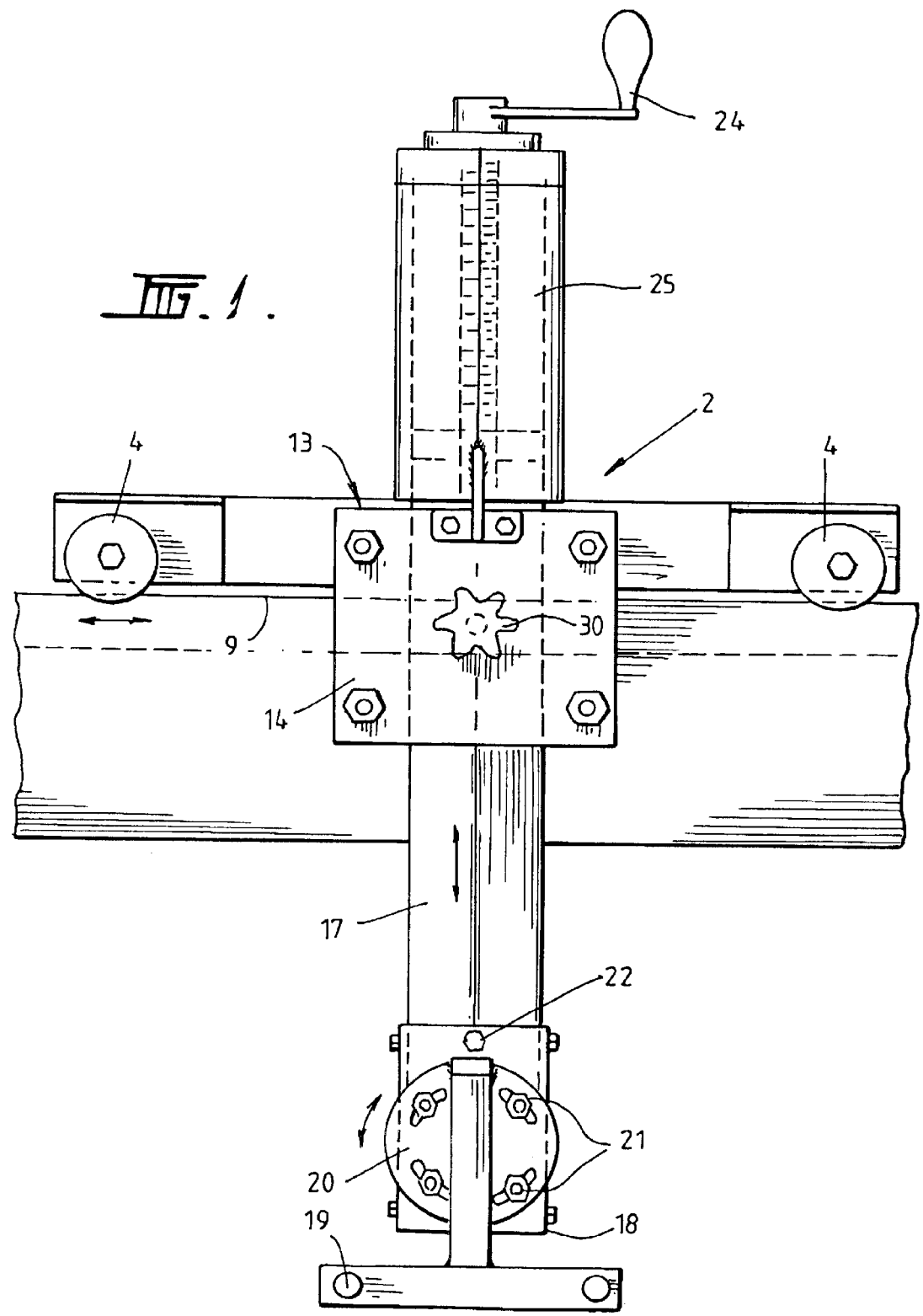
FIG. 1 shows a front view of the guide fitted to a section of track.
Figure 2:
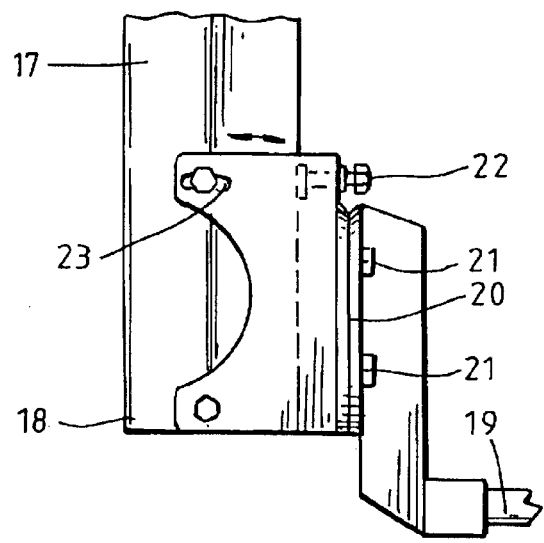
FIG. 2 shows a side view of the machine foot mount.
Figure 5:
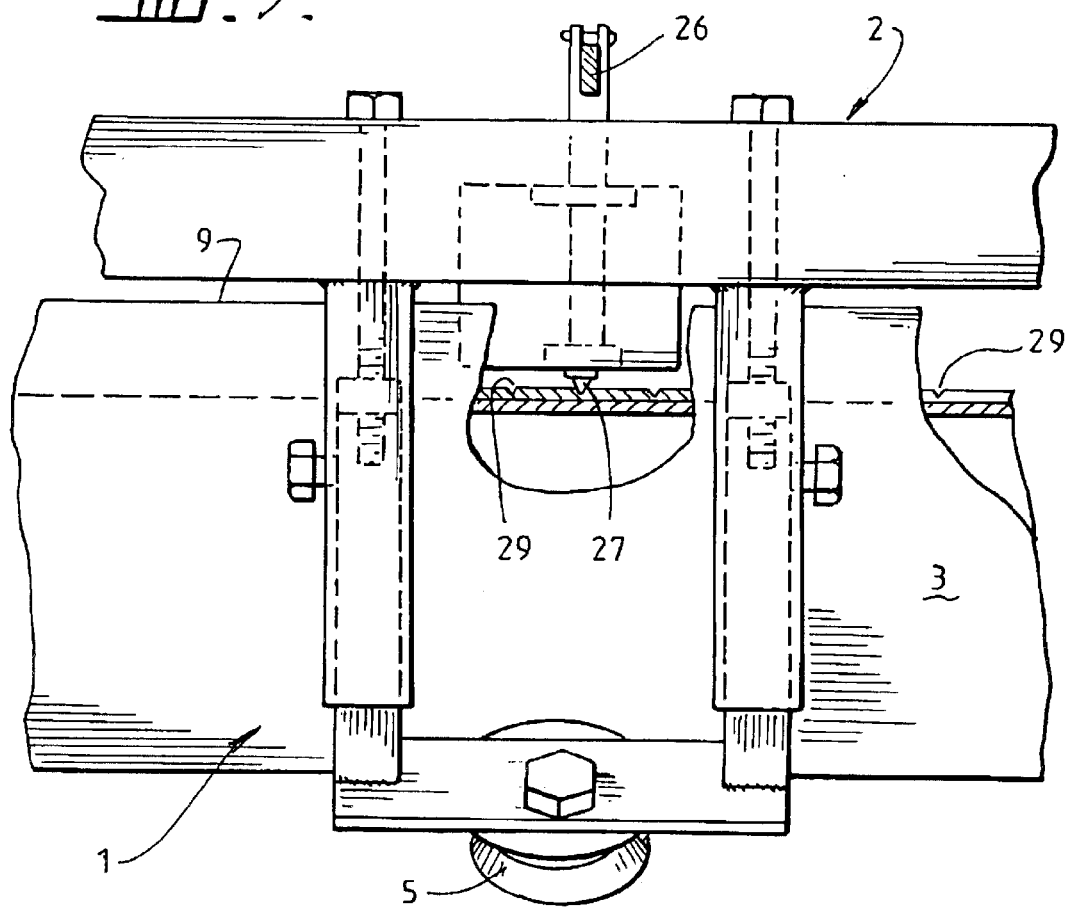
FIG. 5 shows a front view of the housing (with the remaining part of the guide removed) detailing the track fitting mechanics.
Figure 3:
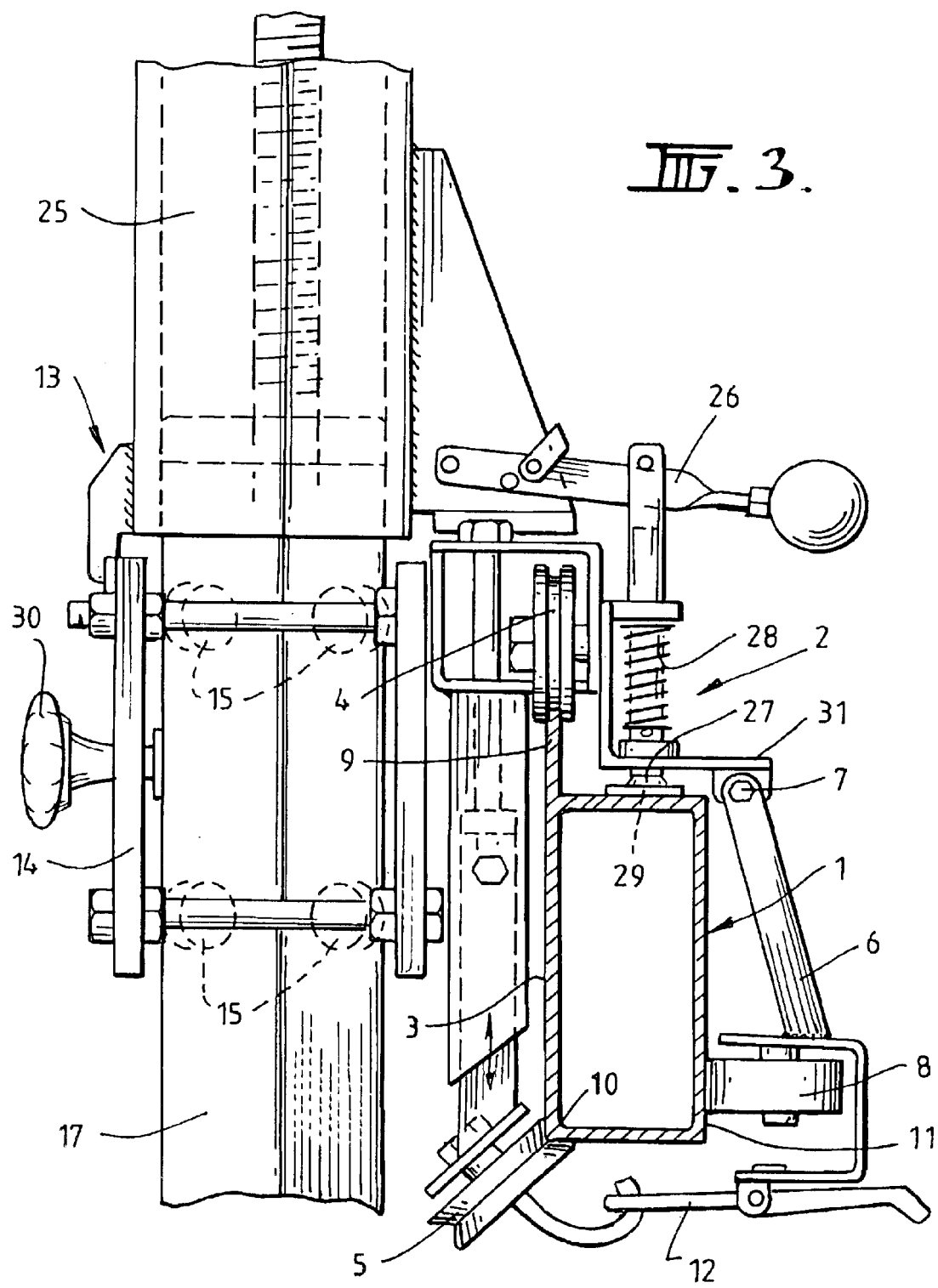
FIG. 3 shows an end view of the guide fitted to a section of track.

Referring firstly to FIGS. 1 to 3, the invention can be seen as a guide system for temporary fitting to one of the elongate track members 1 of an assembled and operational portable timber mill. Portable timber mills generally incorporate two such tracks adapted for placement either side of a timber log whereby the sawing facility of the portable mill, be it either a handsaw or chainsaw unit, can be moved in a controlled fashion along the length of a timber log. The guide of the invention is adapted for use with the elongate track system of such a portable mill whereby an electric router or random orbital sander can be caused to move along the existing tracking system of a portable mill so as to provide a high level of finish to timber boards previously sawn by the portable mill.

The guide of the invention includes a housing 2 adapted for temporary mounting onto one or other of the elongate tracks of the portable mill such that the housing can move backward and forward along the length of the elongate track The housing is provided as a "pull-apart" or opening unit having an internal face member 3 which incorporates two top track wheels 4 and a single oblique track wheel 5 which is orientated at a 45 degree angle. The internal face member has a rear member 6 hinged thereto at 7 via a bridging bracket 31. The rear member 6 is provided with a bottom track wheel 8. In this manner the housing can be readily opened up for fitting at any point along the length of the track without requiring fitting from the end of the track. Once fitted to the track the housing is clipped together to fully and securely embrace the track. The top track wheels and oblique track wheel are provided with a "V" groove tread such that the top track wheels straddle the raised side 9 of the generally channel-shaped elongate track 1. The oblique track wheel 5 is positioned such that its "V" groove tread rides along the lower edge 10 of the elongate track. Once the internal face member 3 and top track wheels 4 are positioned on the elongate track the rear member 6 can be hinged down such that the bottom track wheel 8 located toward the lower end of the rear member is brought to bear on the lower side 11 of the elongate track. In order to ensure snug engagement of all the wheels the rear member and internal face member are joined together by way of a tensioning device 12 which takes the form of an over centre latch connected at one end to the housing rear member and connected at its other end to the internal face member. In order to ensure most efficient clamping at the contact points, being the respective wheels, the tensioner is preferable fitted at or near the oblique track wheel 5 such that when the tensioner is drawn together the "V" groove in the oblique track wheel is caused to snugly engage both adjacent faces of the lower edge 10 of the elongate track.

Fitted to the internal face member 3 is a carriage means 13. The carriage is made up of a transmission housing 14, The transmission housing is provided with a set of roller bearings 15 which are positioned on shaped guides 16 so as to be diagonally orientated for receipt of the four exposed surfaces of the guide arm 17 fitted within the transmission housing, The guide arm is formed of channel section mounted diagonally within the carriage means such that it is self-centring and able to move longitudinally in and out of the carriage means but incapable of moving radially relative to the carriage means. The roller bearings 15 are adjustable and able to be brought into snug engagement with the sides of the guide arm to ensure smooth movement in an orthogonal direction with respect to the elongate track.

The guide arm 17 is provided at a lower end 18 thereof with protruding tynes 19 which serve as a mounting means for fitting of the machine tool of choice, for example an electric router or an electric random orbital sander. The tynes are fitted to the guide arm by way of a mounting plate 20. The mounting plate has adjustable bolts 21, a fine adjustment screw 22 and tilt slots 23 which allow a fill range of adjustments to ensure that the machine tool is accurately and correctly aligned for travel parallel with the elongate track 1.

The movement of the guide arm is controlled by way of a screw-operated height adjuster 24 fitted to a second end 25 of the carriage means. The screw thread is adapted to engage a suitable captive threaded section of the guide arm such that movement of the height adjuster allows fine tuning and accurate adjustment of the guide arm for controlling depth of cut of the machine tool.

The movement of the housing back and forth along the length of the elongate track can be locked by way of a locking mechanism comprising pivoted locking lever 26 which is adapted to activate a locking shoe 27 to act against a spring means 28 to selectively cooperate with stops of indentations 29 positioned on the elongate track. In this manner the longitudinal movement of the carriage can be arrested if so desired.

In use the guide of the invention would be used as an accessory with a portable timber mill where once a log has been milled into planks, the milling machinery would be removed from its elongate tracks and in place thereof would be fitted the guide of the invention. The housing 2 would be opened and the guide positioned by placing top track wheels 4 on the raised side 9 of the elongate track. The weight of the guide and fitted tool would cause the housing to rotate about the top track wheels thereby causing the oblique track wheel 5 to bear upon the lower edge 10 of the elongate track The rear member of the housing would then be lowered down about its hinged region 7 such that the bottom track wheel 8 is brought to bear on the lower side 11 of the elongate track. The over centre tensioning clip would then be fastened and suitably adjusted such that all of the guide wheels are satisfactorily engaged to the elongate track so as to allow free movement back and forth of the guide along the elongate track. The height adjuster 24 would then be operated to raise or lower the guide arm 17 such that the machine tool fitted to the lower end thereof could be adjusted to a suitable height and depth of cut for machining the wooden slabs laid on the bed of the mill. Once the correct height of the guide arm is located the guide arm could be locked by a vertical brake 30 and once the machine is turned on it could then be guided back and forth along the length of the timber slab so as to surface dress and/or sand the freshly machined slab.

In this manner the invention provides for the first time a ready and economical means of surface dressing large dimensioned timber slabs fresh from milling without the need to relocate to separate machinery. The guide of the invention is adapted for use and cooperation with existing portable mill machinery and can be readily configured to fit any number of portable mill designs currently available.

It will be appreciated by persons skilled in the art that numerous variations and/or modifications may be made to the invention as shown in the specific embodiments without departing from the spirit or scope of the invention as broadly described the present embodiments are, therefore, to be considered in all respects as illustrative and not restrictive.

What is claimed is:

1. A guide for a machine tool comprising a housing adapted for mounting onto and traversal along an elongate track, said housing including a carriage means for mounting a guide arm for controlled movement relative to said track, said guide arm having a mount for fitting said machine tool wherein said housing has at least one top track wheel, at least one side track wheel and at least one oblique track wheel adapted for rolling along the top, side and edge of said elongate track respectively.

2. A guide according to claim 1, wherein said top, side and oblique track wheels are adapted for rolling along opposing surfaces of said track so as to provide a snug engagement of said housing to said track.

3. A guide according to claim 1, wherein said oblique track wheel simultaneously opposes both said top and side track wheels.

4. A guide according to claim 1, wherein said track includes a lower channel section and a raised side portion.

5. A guide according to claim 1, wherein said top and oblique track wheels include a "v" groove tread wherein the top tread is adapted to straddle said raised side portion of the elongate track and said oblique track wheel is adapted for straddling said lower edge of the elongate track.

6. A guide according to claim 1, wherein said housing unfolds to facilitate installation onto said track at any point along the length of said track.

7. A guide according to claim 6, wherein said housing comprises an internal face member pivotally connected to a rear member wherein said face member has two or more top track wheels and at least one oblique track wheel and said rear member has at least one side track wheel.

8. A guide according to claim 7, wherein said face and rear members are connected via a bridging member which substantially traverses to top of said elongate track.

9. A guide according to claim 7, wherein said face and rear members are held in engagement to said track by an over center tensioning means.

10. A guide according to claim 8, wherein said bridging member includes a locking mechanism for arresting the movement of said guide along said track.

11. A guide according to claim 9, wherein said locking mechanism includes a locking shoe adapted to cooperate with said track so as to prevent relative movement between said guide and said track.

12. A guide according to claim 1, wherein said guide arm is of square channel section, mounted diagonally within said carriage means to prevent a radial co-axial movement, but allow linear co-axial movement within said carriage means.

13. A guide according to claim 12, wherein said guide arm includes a height adjustment means.

14. A guide according to claim 13 wherein said height adjustment means is a screw thread allowing precise adjustment of said guide arm.

* * * * *